(12) United States Patent
Grimm et al.

(10) Patent No.: US 11,784,527 B2
(45) Date of Patent: Oct. 10, 2023

(54) LINEAR MOTOR STATOR ARRANGEMENT WITH EXTERNAL CONVECTIVE FORCED COOLING

(71) Applicant: Intrasys GmbH Innovative Transportsysteme, Munich (DE)

(72) Inventors: Arnulf Grimm, Burggen (DE); Dieter Kraus, Munich (DE); Tobias Hollmer, Munich (DE)

(73) Assignee: Intrasys GmbH Innovative Transportsysteme, Munich (DE)

(*) Notice: Subject to any disclaimer, the term of this patent is extended or adjusted under 35 U.S.C. 154(b) by 114 days.

(21) Appl. No.: 17/409,687

(22) Filed: Aug. 23, 2021

(65) Prior Publication Data
US 2022/0069656 A1  Mar. 3, 2022

(30) Foreign Application Priority Data
Aug. 25, 2020 (DE) .................. 10 2020 122 239.4

(51) Int. Cl.
*H02K 3/24* (2006.01)
*H02K 5/20* (2006.01)
*H02K 9/193* (2006.01)

(52) U.S. Cl.
CPC ............... *H02K 3/24* (2013.01); *H02K 5/203* (2021.01); *H02K 9/193* (2013.01)

(58) Field of Classification Search
CPC .......... H02K 3/24; H02K 5/203; H02K 9/193; H02K 3/47; H02K 9/04; H02K 11/25; H02K 41/031; H02K 9/02; H02K 41/02
See application file for complete search history.

(56) References Cited

U.S. PATENT DOCUMENTS

| | | | | |
|---|---|---|---|---|
| 4,839,545 A | * | 6/1989 | Chitayat ................ | H02K 9/197 310/58 |
| 5,973,427 A | * | 10/1999 | Suzuki ..................... | H02K 3/24 310/52 |

(Continued)

FOREIGN PATENT DOCUMENTS

| | | | | |
|---|---|---|---|---|
| JP | S5976164 A | | 5/1984 | |
| JP | H01152949 A | | 6/1989 | |
| JP | H02-237459 A | * | 9/1990 | ............. H02K 41/02 |
| JP | H02237459 A | | 9/1990 | |

(Continued)

OTHER PUBLICATIONS

English translation of JP-H05-25980U (Year: 1993).*

(Continued)

*Primary Examiner* — Tulsidas C Patel
*Assistant Examiner* — Joshua Kiel M Rodriguez
(74) *Attorney, Agent, or Firm* — Rankin, Hill & Clark LLP

(57) ABSTRACT

A linear motor stator arrangement including a coil arrangement with conductive electrical coils arranged along an axis for generating a magnetic field, a convective cooling device with a fluid line extending along a pathway, a section of the fluid line exhibits as a cooling section outlet ports in a fluid line wall which faces the coil arrangement and are arranged along the pathway with a spacing therebetween, the stator arrangement having a conveyor device which is connected with the fluid line and for conveying a fluid in the fluid line and through the outlet ports to the coil arrangement, wherein the cooling section there are provided along the pathway outlet ports with quantitatively different outlet port cross-sections through which fluid can flow and/or the spacings between two outlet ports arranged immediately one after another along the pathway in different regions of the cooling section along the pathway are quantitatively different.

20 Claims, 10 Drawing Sheets

(56) References Cited

U.S. PATENT DOCUMENTS

| | | | |
|---|---|---|---|
| 6,469,406 B1 | 10/2002 | Hwang et al. | |
| 9,048,707 B2 | 6/2015 | Chang et al. | |
| 10,862,385 B2 | 12/2020 | Julen et al. | |
| 2016/0334175 A1* | 11/2016 | Eckert | F28D 7/103 |

FOREIGN PATENT DOCUMENTS

| | | | | |
|---|---|---|---|---|
| JP | H05-25980 U | * | 4/1993 | ............ H02K 41/02 |
| JP | H0525980 U | | 4/1993 | |
| JP | H08168233 A | | 6/1996 | |
| JP | 2000245131 A | | 9/2000 | |
| JP | 2004215419 A | | 7/2004 | |
| KR | 20000075005 A | | 12/2000 | |
| KR | 100298539 B1 | | 11/2001 | |
| KR | 20030049465 A | | 6/2003 | |
| KR | 10-1445862 B1 | * | 9/2014 | ............ H02K 1/32 |

OTHER PUBLICATIONS

English translation of JP-H02-237459A (Year: 1990).*
English translation of KR-10-1445862B1 (Year: 2014).*

European Search Report for corresponding EP 21192245.5 dated Jan. 12, 2022, 10 pgs.
Espacenet Bibliographic data: JP H01152949 (A), Published Jun. 15, 1989, 1 pg.
Espacenet Bibliographic data: KR 20000075005 (A), Published Dec. 15, 2000, 1 pg.
Espacenet Bibliographic data: JP H02237459 (A), Published Sep. 20, 1990, 1 pg.
Espacenet Bibliographic data: JP 2000245131 (A), Published Sep. 8, 2000, 1 pg.
German Search Report for corresponding DE 10 2020 122 239.4 dated May 5, 2021, 7 pgs.
Espacenet Bibliographic data:JP H08168233 (A), Published Jun. 25, 1996, 1 pg.
Espacenet Bibliographic data:JP S5976164(A), Published May 1, 1984, 1 pg.
Espacenet Bibliographic data:JP 2004215419 (A), Published Jul. 29, 2004, 1 pg.
Espacenet Bibliographic data:KR 100298539 (B1), Published Nov. 2, 2001, 1 pg.
Espacenet Bibliographic data:KR 20030049465 (A), Published Jun. 25, 2003, 1 pg.

* cited by examiner

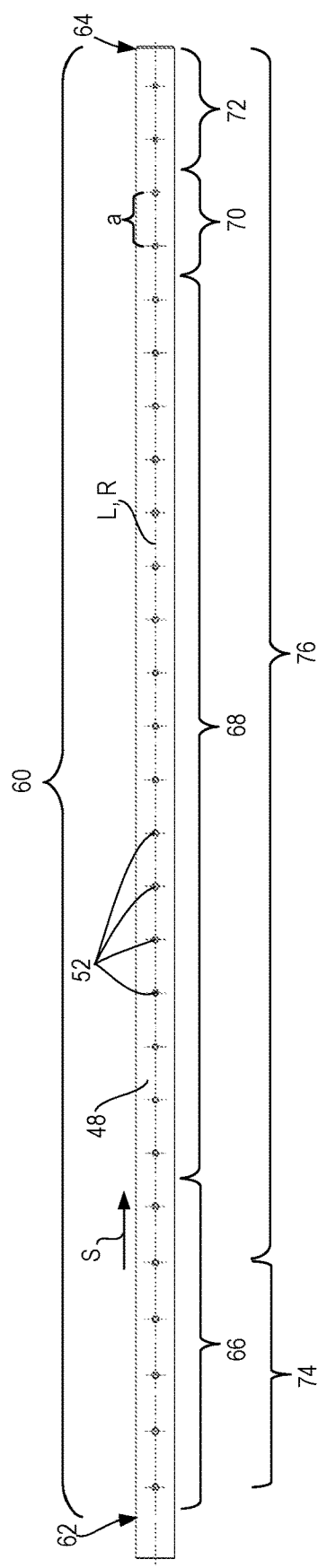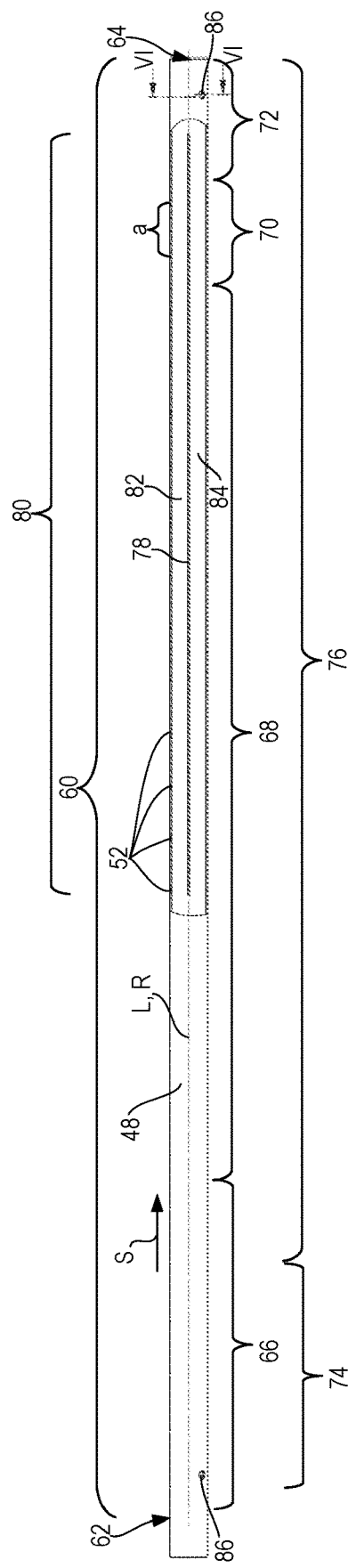

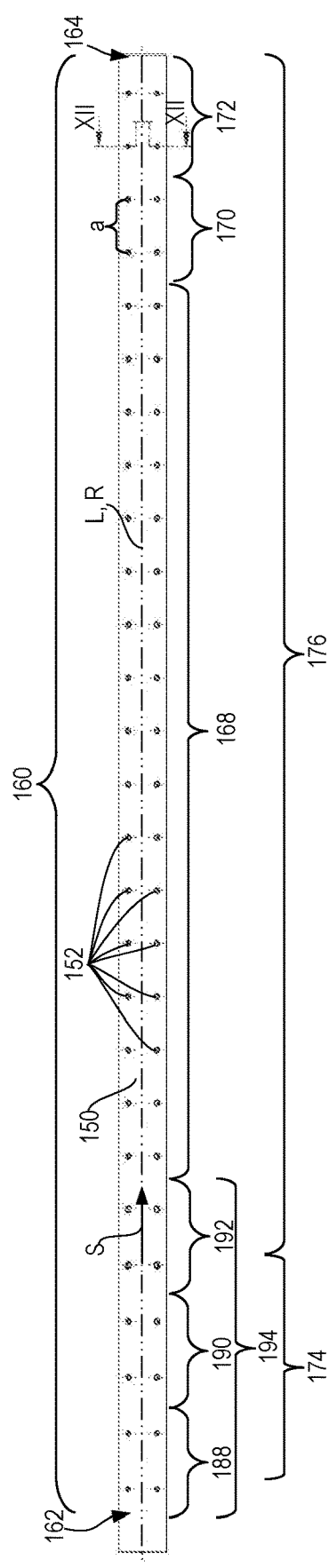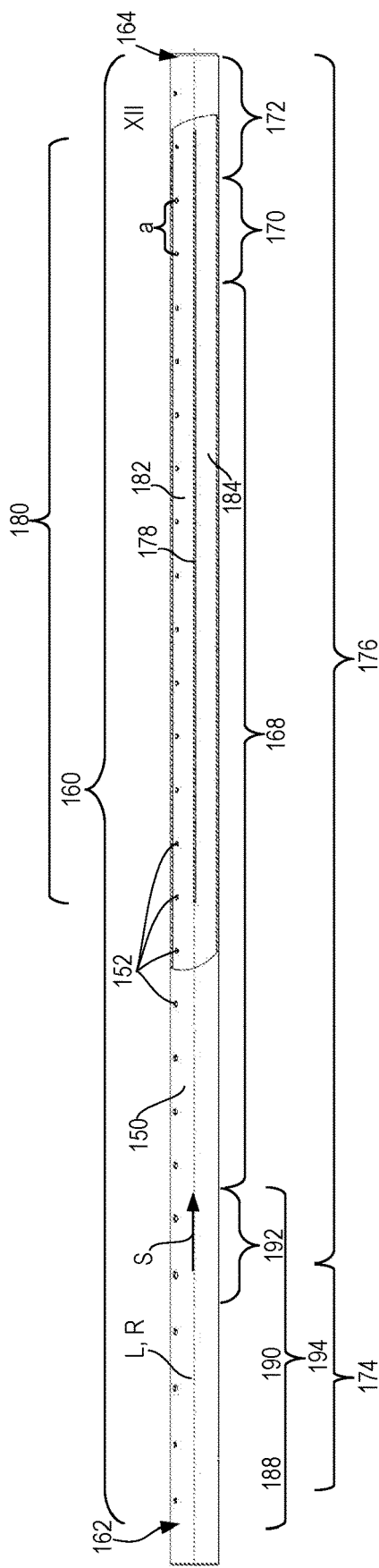

LINEAR MOTOR STATOR ARRANGEMENT WITH EXTERNAL CONVECTIVE FORCED COOLING

This Application claims priority in German Patent Application DE 10 2020 122 239.4 filed on Aug. 25, 2020, which is incorporated by reference herein.

The present invention concerns a linear motor stator arrangement, comprising a coil arrangement with a plurality of conductive electrical coils arranged so as to follow one another along a sequence axis for generating a temporally and spatially varying magnetic field in the neighborhood of the coil arrangement.

BACKGROUND OF THE INVENTION

Such linear motor stator arrangements are used for example for accelerating and decelerating transportation systems, in particular passenger-carrying transportation systems. One area of application with especially exacting technical requirements is that of the driving and braking of passenger-carrying vehicles in fairground rides for public entertainment, such as for instance in rollercoasters, water slides, and the like.

In the case of the acceleration and deceleration of a passenger car which is required at regular intervals in fairground rides, any stator arrangements are subjected to heavy thermal stresses. In order to increase the cost-effectiveness of such facilities, one strives to shorten the operating intervals of linear motors. As a result, the cooling phases between operating phases become shorter and the thermal stress increases. The heat generated in stator arrangements during their operation has to be dissipated in order to prevent the overheating of the stator arrangements.

From WO 2016/202798 A1 there is known a linear motor stator arrangement with a flat cooling housing through which cooling fluid can flow. The cooling housing exhibits in every direction orthogonally to winding axes about which the respective coils of the stator arrangement are wound, approximately the dimensions of a coil housing that accommodates the coil arrangement. The coil arrangement touches the cooling housing, such that heat created in the coil arrangement due to ohmic resistance in the coils can be transferred by conduction to the cooling housing and from there dissipated by convection through the cooling fluid.

A constant requirement for such winding arrangements is that their thickness measurement, normally running along the coil winding axes, is as small as possible. According to the solution known from WO 2016/202798 A1, the linear motor stator arrangement is widened by the thickness of the cooling housing compared with an uncooled stator arrangement. As a result, the measurement of the air gap between the coil arrangement and an interaction component on the rotor side moveable relative to the stator arrangement is undesirably increased.

The interaction component comprises, and this also applies to the present invention, in the case of a linear synchronous motor a magnet arrangement with magnets arranged one after the other along the sequence axis with alternating pole alignments, in particular permanent magnets, or in the case of a linear asynchronous motor an induction component in which eddies are induced by means of the magnetic field of the stator arrangement, which themselves in turn effect a magnetic field which interacts with the magnetic field of the stator arrangement to achieve a force effect along the sequence axis. The stator arrangement and the interaction component form together a linear motor.

Furthermore, stator arrangements are known which comprise a stator housing through which a cooling fluid can flow directly for heat dissipation. These stator arrangements are more complex in their construction compared with an uncooled coil arrangement, since in the stator housing, in addition to cavities for accommodating the coil arrangement and its electrical connections, cooling ducts and their connections for enabling a cooling fluid to flow through them have to be configured.

SUMMARY OF THE INVENTION

It is the task of the present invention to propose a linear motor stator arrangement which even under power-intensive operation can be protected simply and reliably against overheating.

This task is solved in a linear motor stator arrangement, as described in the beginning, by it comprising additionally a convective cooling device for convective forced cooling comprises. The convective cooling device exhibits a fluid line extending along a pathway, of which at least one section runs alongside coil arrangement at a spacing from coil arrangement. The section of the fluid line running alongside the coil arrangement exhibits as a cooling section a large number of outlet ports in a fluid line wall, which point towards the coil arrangement and are arranged one after another along the pathway at a spacing from one another. The stator arrangement, in particular the convective cooling device, further comprises a conveyor device, which is configured as connected with the fluid line and for conveying a fluid in the fluid line and through the outlet ports towards the coil arrangement. In the cooling section there are provided outlet ports along the pathway. The outlet ports exhibit quantitatively different outlet port cross-sections through which fluid flows and/or the outlet ports are arranged in different spacing regions of the cooling section extending along the pathway at quantitatively different spacings between pairs of outlet ports arranged immediately one after another along the pathway.

Preferably the coil arrangement is accommodated in a coil housing, protected against external influences. The coil housing can be a shell housing and can as such be assembled from at least two shell parts. The coil housing is normally a non-curved flat structure, whose thickness is significantly smaller than its height orthogonally to its thickness. The height in turn is smaller than the length orthogonally both to the thickness and to the height. The winding axes of the coils of the coil arrangement usually run in the thickness direction of the coil housing. The length is normally parallel to the sequence axis.

The fluid line is arranged outside the coil housing such that the coil housing can be configured with a small thickness orthogonal to the sequence axis. The fluid line can comprise a hose and/or a pipe. For reasons of good form stability, preferably the cooling section is formed from a pipe. A fluid-guiding connection between the conveyor device, for example a fan in the case of a gas, in particular air, as a convectively cooling fluid, or a pump in the case of a liquid as a convectively cooling fluid, and the cooling section can be formed from a flexible hose to facilitate the assembly, allowing problem-free connection of conveyor device and cooling section even where the arrangement site of a fluid outlet of the conveyor device and/or a fluid inlet of the cooling section is modified.

Preferably the fluid which flows out through the outlet ports of the cooling section towards the coil arrangement, in particular to an outer lateral face of the coil housing, is air, which is available in unlimited quantities through aspiration by the conveyor device from the environment.

The above notwithstanding, it should not be ruled out that the fluid line is a one-piece fluid line from the conveyor device to the end of the cooling section. Preferably, in order to achieve the highest possible fluid throughput, the fluid line is closed at the outlet ports at the end of the cooling section. It is, therefore, preferably not a circulation line, which in the direction of flow of the fluid along the pathway downstream of the cooling section returns to the conveyor device.

The cooling section, especially in its preferable design as a form-stable fluid line pipe, runs with its preferably straight pathway section parallel to the sequence axis and thus parallel to the longitudinal direction of the coil arrangement.

Although it should not be ruled out that the plurality of outlet ports in the cooling section along the pathway can be arranged one after another in different peripheral regions around the pathway, an arrangement along a parallel to the pathway, which preferably is parallel to the sequence axis, is preferable. The midpoints of the outlet ports lie, according to this preferred embodiment, along a parallel to the pathway. Especially preferably, midlines, each of which penetrates through one outlet port along its outlet direction, lie in a common plane. Ultimately, from every outlet port an inflow region of the coil arrangement, in particular of the coil housing, is to be cooled convectively with fluid. Preferably, the inflow regions into which fluid flows from the individual outlet ports should have at the coil arrangement, in particular at the coil housing, approximately the same shape and with regard to the sequence axis as a length dimension and with regard to the height direction which is orthogonal both to the sequence axis and to the thickness direction approximately the same position relative to the coil arrangement.

In a fluid line, which has fluid flowing in it along its pathway and which exhibits transversely, in particular orthogonally, to the pathway intermittently outlet ports penetrating through a wall of the fluid line to the external environment, there occur during the flow of the fluid complex flow and pressure conditions. These flow and pressure conditions vary along the pathway, inter alia due to the fluid emerging from the fluid line through the outlet ports.

Through an arrangement of outlet ports with differing outlet port cross-section sizes along the pathway, despite the flow and pressure conditions varying along the pathway a cooling effect produced by fluid emerging from the outlet ports can be standardized and/or evened out along the pathway in the cooling section.

The same applies to differing spacings between consecutive outlet ports. By choosing greater spacings between outlet ports through which due to the variable flow and pressure conditions along the pathway more fluid emerges in the cooling section per unit of time than through other outlet ports, and vice versa, the cooling effect produced by fluid emerging from the outlet ports can likewise be standardized and/or evened out along the pathway.

This involves a complex interconnected optimization problem, since the modification of an outlet port cross-section or of a spacing at a location along the pathway modifies the flow conditions of fluid when emerging through an outlet port at another location along the pathway, without the latter outlet port or its location in the arrangement having been modified.

Hereinafter, first the aspect of the differing outlet port cross-sections and then the aspect of the differing spacings shall be discussed and further developed. The terms employed here, 'port region' and 'spacing region', each denote a region of the cooling section extending along the pathway. The labeling as port region and as spacing region serves merely for distinguishing the reference one time to the outlet port cross-sections and another time to the spacings between outlet ports.

In principle, during operation of the conveyor device fluid flows through the cooling section along the pathway in a direction of flow. Since the pathway is considered as a virtual pathway penetrating centrally through the fluid line, normally the direction of flow locally at every point of the conveying line is tangential to the pathway in the case of a curved pathway and collinear with it in the case of a straight pathway.

The operation of the conveyor device can take place continuously or can take place discontinuously when necessary. The stator arrangement can exhibit a control device which is configured to control the operation of the conveyor device. At the coil arrangement there can be arranged at least one temperature sensor, which detects a temperature of the coil arrangement and/or a temperature in the interior of the coil housing. The at least one temperature sensor can be connected to the control device for the purpose of signal transmission. The control device can be configured to operate the conveyor device in accordance with signals of the at least one temperature sensor.

For the sake of as uniform a cooling rate as possible along the pathway with at the same time an adequate cooling effect, it has proved to be advantageous if in a port region of the cooling section located further downstream, outlet ports with smaller outlet port cross-sections are provided than in a port region located further upstream. This arrangement is unusual in so far as due to the friction-induced pressure losses increasing linearly with the flow length in the fluid line, one would expect that proceeding from a fluid introduction location the outlet port cross-sections should become quantitatively larger in the direction of flow in order to offset the friction-induced pressure losses.

Although the outlet port cross-sections can decrease quantitatively continuously in the direction of flow, it is sufficient and from a fabrication perspective advantageous to divide the cooling section into different port regions in each of which predominantly or preferably completely outlet ports with quantitatively uniform outlet port cross-sections are arranged.

Then the cooling section can exhibit at least two, preferably at least three, especially preferably at least four port regions following one another in the direction of flow, of which a first port region exhibits at least one outlet port with a larger outlet port cross-section than a second port region following the first port region directly in the direction of flow. Preferably in turn, the second port region exhibits at least one outlet port with a larger outlet port cross-section than a third port region following the second port region directly in the direction of flow. In the case of a fourth port region existing, the same applies mutatis mutandis to the third and the fourth port regions.

Additionally to an arrangement in which a further outlet port located downstream of a selected outlet port exhibits only either an equally large or a smaller outlet port cross-section than the selected outlet port, the cooling section can comprise a port zone located further upstream which exhibits at least two, preferably at least three port regions following one another in the direction of flow of which a first port region exhibits at least one outlet port with a smaller outlet port cross-section than a second port region immediately following the first port region in the direction of flow. Consequently in the port zone located upstream, a further outlet port of the port zone located downstream of a selected outlet port of the port zone can exhibit a larger outlet port cross-section than the selected outlet port.

A fluid line can exhibit just one row of outlet ports following one another along the pathway or it can exhibit more than one, in particular exactly two rows of outlet ports following one another along the pathway. The latter is for example the case where with one fluid line, two coil arrangements arranged side by side and with a clearance from one another with parallel sequence axes are to be cooled. Then fluid flows from every row of outlet ports preferably towards another coil arrangement.

In the case of a fluid line with exactly one row of outlet ports arranged along the pathway at a spacing from one another, often but not always the former case is preferable, according to which for the entire cooling section it is the case that the outlet port cross-section of an outlet port located further downstream is only quantitatively smaller than or equally large as an outlet port located further upstream. In contrast for fluid lines with more than one row of outlet ports, often but not always the latter case with the port zone located upstream has turned out to be advantageous.

Preferably the port zone in which the outlet port cross-section of an outlet port located further downstream is not smaller than the outlet port cross-section of an outlet port located further upstream, joins directly the location of the fluid introduction into the cooling section. Preferably, the port zone is the sole port zone of the cooling section, such that downstream following on from the port zone the outlet port cross-sections only either become smaller or remain section-wise equal in size. Preferably, the port zone measured along the pathway is shorter than the totality of the port regions that join it with outlet ports becoming smaller in the direction of flow.

For the most uniform cooling rate possible along the pathway with at the same time an adequate cooling effect, at least two, preferably more than two, of the port regions located one after another in the direction of flow exhibit a differing number of outlet ports and/or a differing length along the pathway.

In the case of preferably circular outlet ports, such as can be formed simply by means of drilled holes, preferably the outlet port diameter upstream of the longitudinal middle of the cooling section varies from a port region located further upstream to the port region immediately adjacent downstream by not more than 10% based on the larger diameter. Downstream of the longitudinal middle of the cooling section, in particular in the last 25% of the length of the cooling section, the variation in the outlet port diameter from a port region located further upstream to a port region following it immediately downstream can be up to 25% based on the greater of the diameters present. This means that preferably the outlet port diameter becomes progressively smaller from the location of the fluid introduction into the cooling section up to the end of the cooling section.

Within a port region, the outlet port cross-sections of all the outlet ports of the port region are preferably quantitatively of equal size, such that the outlet ports of a port region can be fabricated with one and the same tool. This preferably applies to every port region.

Likewise for achieving the most uniform cooling rate possible along the pathway through the fluid emerging from the outlet ports, for the spacings between outlet ports following one another immediately along the pathway it is the case that in a spacing region of the cooling section located further downstream, outlet ports are arranged along the pathway at a smaller spacing from one another than in a spacing region located further upstream.

Individual spacing regions can overlap with port regions along the pathway. Normally, however, a cooling section preferably exhibits fewer spacing regions than port regions. Per definition, a port region should begin and end in the middle of the spacing between two outlet ports with differing outlet port cross-sections. A spacing region begins and ends at the respective midline of an outlet port passing through the outlet port, whose immediately upstream adjacent outlet port is located at a different spacing away from it than its immediately downstream adjacent outlet port.

For advantageous homogenization of the attainable cooling rate along the pathway, the cooling section preferably exhibits at least two spacing regions following one another in the direction of flow, of which in one first spacing region outlet ports are arranged following one another at a greater spacing than in a second spacing region immediately following the first spacing region in the direction of flow. A spacing region can extend over more than half the length of the cooling section. Preferably such a long spacing region extends at least over the entire downstream longitudinal half of the cooling section.

Basically the same applies to the spacing regions mutatis mutandis as to the port regions, such that for further homogenization of the attainable cooling rate along the pathway, advantageously at least two spacing regions located one after another in the direction of flow can exhibit a differing number of outlet ports and/or a differing length along the pathway.

Likewise it is advantageously simple from a fabrication perspective if for at least one spacing region, preferably for every spacing region, it is the case that the spacings between two outlet ports immediately following one another in the direction of flow are quantitatively equal in size for all outlet ports of the spacing region.

Regardless of the described measures for the homogenization of the attainable cooling rate along the pathway through quantitatively different design of the outlet port cross-sections and/or through a choice of differing spacing dimensions between immediately consecutive outlet ports along the pathway, undesirable noise emission can arise at the cooling section due to the fluid flowing through the outlet ports. Since the cooling section often has fluid flowing through it continuously or if necessary over a prolonged period of time, the noise emission is perceived as a continuous tone which does not permanently recede behind ordinary ambient noise, in particular where the linear motor stator arrangement is situated sufficiently near to potential human crowds, for instance in the vicinity of a railroad station for a change of persons of a passenger carrier, in particular of a fairground ride for public entertainment.

As a measure for decreasing noise emission, it has proved to be advantageous if along a separation region in the cooling section a partition is arranged in the interior of the fluid line which along its extension subdivides an interior volume of the fluid line physically into two part-volumes separated from one another. This measure can preferably be applied in addition to the aforementioned measures for configuring differing outlet port cross-sections and/or spacings or indeed alternatively to them. The separation region can therefore also be configured at a cooling section which exhibits only outlet ports with the same outlet port cross-section which are arranged one after another at a single uniform spacing from one another along the pathway.

In principle, the partition can along its extension in the fluid line subdivide the interior volume of the fluid line into part-volumes differing in size. For the most marked noise mitigation possible, however, it is advantageous if the part-volumes do not differ quantitatively too much. Preferably, therefore, it is provided that the part-volumes located on the two sides of the partition differ in their size by not more than 10%, based on a larger one of the part-volumes, preferably by not more than 5%, where especially preferably the part-volumes located on the two sides of the partition are equal in size. Preferably both part-volumes are open along the pathway and fluid can flow through them. Preferably the partition extends along the pathway collinearly with or parallel to the pathway, respectively. Orthogonally to the pathway the partition preferably extends along a diametrical direction from an interior wall section of the fluid line to a dia-metrically opposite interior wall section of the fluid line.

The thickness of the partition is preferably constant over its entire area. The thickness of the partition preferably differs quantitatively by no more than 50% from the thickness of the wall of the fluid line in the separation region, based on the wall thickness of the fluid line. Alternatively or additionally, according to an advantageous further development of the present invention the thickness of the partition should be so chosen that when viewing a cross-section orthogonal to the pathway, the cross-sectional area of the partition takes up not more than 10% of the cross-sectional area of the internal volume of the fluid line encompassed by the wall of the fluid line. This applies preferably to at least half, especially preferably to at least three quarters, more especially preferably to 100% of the length of the partition.

In principle, the partition can be a curved partition, albeit this is not necessary for the desired noise mitigation. For reasons of simple assembly, therefore, preferably the partition is a plane partition.

The partition can, in particular when it extends along a diametrical direction, inserted in the interior volume of the fluid line and there be held in frictional touching contact with inner wall sections of the fluid line. For a secure arrangement and anchoring of the partition in the internal volume of the fluid line, the partition can be cemented or soldered or welded to the inner wall of the fluid line. For this purpose the fluid line can be formed from at least two shell components joined into a pipe, in order to facilitate the fabrication of a durable bonding of the partition with the fluid line.

Since in a preferred design the fluid line exhibits more port regions than spacing regions, it is preferable if the partition extends over more than one port region. Consequently, in the separation region there are located outlet ports with differing outlet port cross-sections.

Although it is likewise possible that the partition extends over more than one spacing region, it is nevertheless preferable if the partition extends completely within one spacing region. The spacing region in which the partition extends and which consequently contains the separation region or is the separation region, is preferably the largest spacing region in the cooling section.

For the noise-mitigating effect of the partition it is also advantageous if the partition is neither too long nor too short along the pathway. Therefore the partition is preferably shorter than the cooling section. According to a preferred embodiment, the partition extends over more than 40%, preferably over more than 50% of the length of the cooling section. Likewise preferably, the partition extends over less than 75%, preferably over less than 65% of the length of the cooling section.

As experiments have shown, the arrangement of a partition in the vicinity of the introduction point of the fluid into the cooling section has only a minor noise-mitigating effect. Preferably the fluid is introduced into the cooling section at a longitudinal end of it and flows from this introduction longitudinal end along the pathway through the cooling section all the way to the longitudinal end of the cooling section opposite to the introduction longitudinal end. Preferably the partition is arranged with at least 70% of its longitudinal extension, preferably with at least 80% of its longitudinal extension, in a region located downstream of the longitudinal middle of the cooling section. Thereby the partition is sufficiently far away from the introduction longitudinal end in order to suppress noise emission with increasing spacing of the fluid from the introduction longitudinal end.

In principle, it can be envisaged that the partition reaches all the way to the longitudinal end of the cooling section opposite to the introduction longitudinal end along the pathway and preferably also the fluid line overall. Preferably, however, the partition ends in the direction of flow before the longitudinal end of the cooling section and in particular before the longitudinal end of the fluid line, in order to allow redirection of fluid at the end of the cooling section and/or of the fluid line respectively. In the direction of flow, therefore, there links to the separation region a region of the cooling section in which the interior volume of the fluid line, as likewise upstream of the separation region, is no longer subdivided. The partition is therefore preferably arranged at a spacing from both longitudinal ends of the cooling section.

Since in the direction of flow of the fluid, flow of fluid is no longer necessary or helpful beyond the cooling section, preferably the fluid line ends where also the cooling section ends. If the cooling section is preferably formed by a pipeline, the pipeline exhibits at the downstream end an end wall or a plug in order to prevent flow of fluid beyond the downstream end of the cooling section.

Regardless of whether the cooling section exhibits only one or several mutually parallel rows of outlet ports, for achieving the lowest possible noise emission of the fluid-venting cooling section it is advantageous if all the outlet ports arranged in the separation region are arranged on the same side of the partition. If the cooling section exhibits only one row of outlet ports parallel to the pathway, preferably these outlet ports are situated in the peripheral middle around the pathway of the wall section of the fluid line that together with the partition demarcates a part-volume of the interior volume of the fluid line. If the cooling section comprises more than one row of outlet ports, where the plurality of rows preferably each runs along an arrangement axis parallel to the pathway, the outlet ports are preferably arranged in a peripheral direction around the pathway symmetrically relative to the peripheral middle of the wall section of the fluid line that together with the partition demarcates a part-volume of the interior volume of the fluid line.

Formulated in general terms, preferably a plurality of outlet ports and/or respectively especially preferably all outlet ports are arranged in such a way that their virtual midlines penetrating through a line wall of the fluid line are located in an angular region of not more than 90°, preferably of not more than 80°, especially preferably of not more than 75°, around the pathway. Then it can be made certain that under an arrangement of the cooling section with pathway parallel to the sequence axis, an adequate cooling effect is attained at the coil arrangement, where each outlet port makes a contribution to the cooling effect.

The linear motor stator arrangement can exhibit on both sides of a coil arrangement one fluid line each with a cooling section designed as described above, in order to be able to cool the coil arrangement convectively on both sides. Such an arrangement of a coil arrangement with cooling sections arranged on both sides alongside it at a spacing is a linear motor stator arrangement, of which either several can be arranged alongside each other, i.e. with several parallel coil arrangements, in order to achieve the highest possible propulsive force and/or several can be arranged along a common sequence axis one after another, i.e. with collinear and/or coplanar coil arrangements respectively, in order to achieve propulsive force over the longest possible length.

Where two coil arrangements are to be arranged alongside each other with sequence axes parallel to one another, their spacing from each other orthogonally to the sequence axis can be reduced without detriment to the attainable cooling effect by arranging between the coil arrangements, instead of two fluid lines each with one cooling section for every coil arrangement, only one fluid line with one cooling section but with at least one row of outlet ports for every coil arrangement.

In order to rule out impairment of the magnetic interaction of the linear motor stator arrangement with the interaction component mentioned in the beginning, preferably every cooling section of a coil arrangement is so arranged that when viewing the coil arrangement along the usually mutually parallel winding axes of the conductive coils arranged in the coil arrangement, the cooling section does not overlap with the coils.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
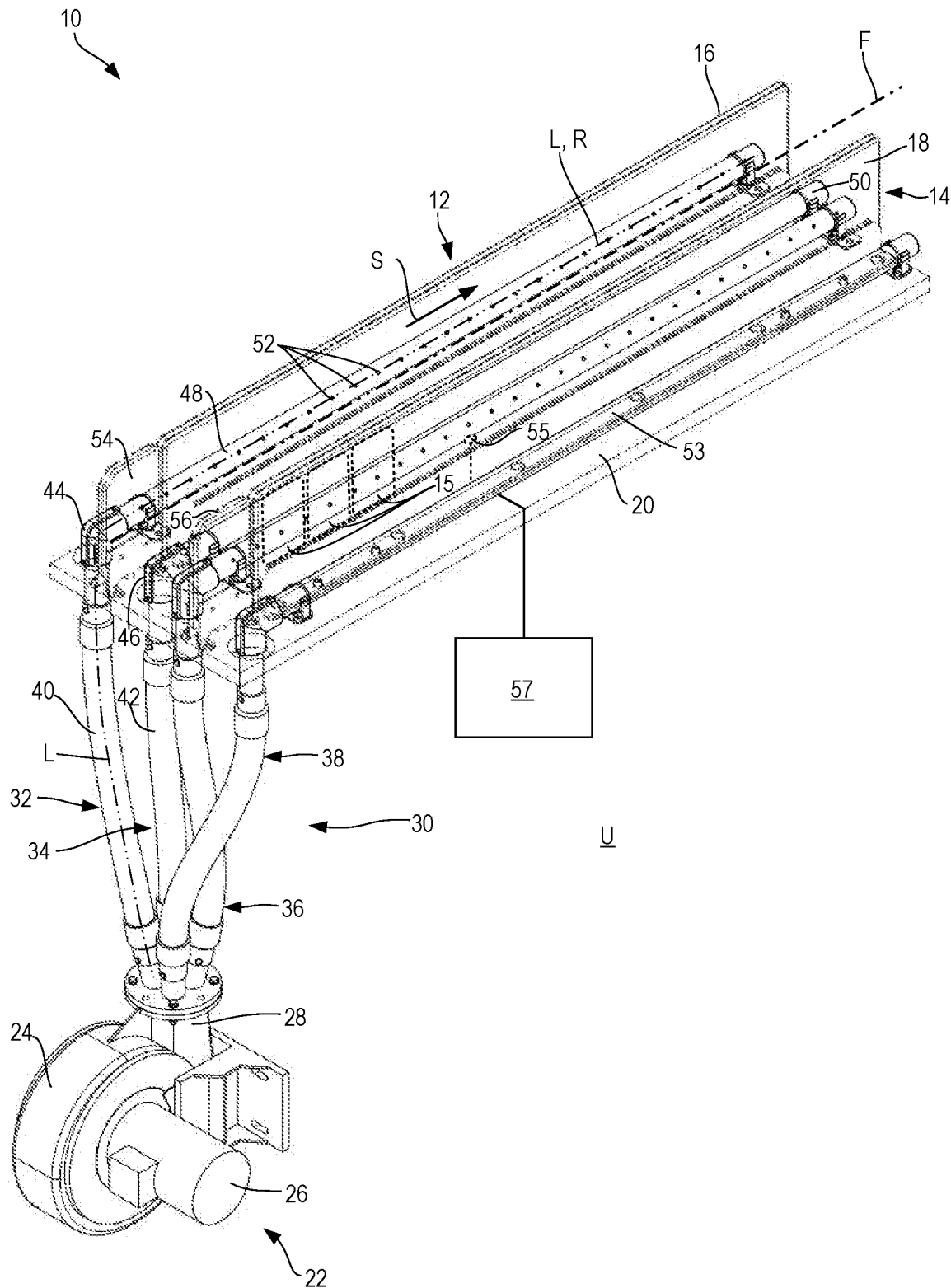
FIG. 1 A perspective view of a first embodiment of the invention's linear motor stator arrangement of the present application, FIG. 2 A front view of the linear motor stator arrangement of the first embodiment along the sequence axis, FIG. 3 A top view of the linear motor stator arrangement of the first embodiment, FIG. 4 A pipe component for forming a cooling section of the fluid lines of the linear motor stator arrangement of the first embodiment, FIG. 5 A part-sectional view of the pipe components of FIG. 4 with completely depicted partition in the interior of the cooling section, FIG. 6 A cross-sectional view through the pipe component of FIG. 5 along the offset sectional plane VI-VI of FIG. 5, FIG. 7 A perspective view of a second embodiment of the invention's linear motor stator arrangement of the present application, FIG. 8 A front view of the linear motor stator arrangement of the second embodiment along the sequence axis, FIG. 9 A top view of the linear motor stator arrangement of the second embodiment, FIG. 10 A pipe component for forming a cooling section of the fluid line arranged between two parallel coil arrangements of the linear motor stator arrangement of the second embodiment, FIG. 11 A part-sectional view of the pipe components of FIG. 10 with completely depicted partition in the interior of the cooling section, and FIG. 12 A cross-sectional view through the pipe component of FIG. 5 along the offset sectional plane XII-XII of FIG. 10.

Referring now to the drawings wherein the showings are for the purpose of illustrating preferred and alternative embodiments of the invention only and not for the purpose of limiting the same, in FIG. 1, a first embodiment of the invention's linear motor stator arrangement is labelled generally with 10. The linear motor stator arrangement 10 is also labelled briefly in the present application only as 'stator arrangement 10'. The stator arrangement 10 comprises two coil arrangements 12 and 14 parallel to one another, which extend along a common sequence axis F. For the sake of improved clarity of the depiction, the coil arrangements 12 and 14 are indicated only by a dashed phantom line, such that the observer of FIG. 1 can look through the coil arrangements that are opaque per se. Likewise for the coil arrangement 14, only three conductive coils 15 following one another along the sequence axis F are indicated. The winding axes of the coils 15 run orthogonally to the sequence axis F in the thickness direction of the coil arrangements 12 and 14 respectively.

The coil arrangements 12 and 14, each of which exhibits a coil housing 16 or 18 respectively which completely encloses the coils 15 accommodated in it, are mounted on a carrier plate 20. The carrier plate 20 can be mounted firmly on a device framework of a predefined travel route of a vehicle drivable with the stator arrangement 10 for movement along the sequence axis F. The drivable vehicle can for example be a passenger carrier of a fairground ride of a public entertainment contrivance which is railbound by means of tracks or grooves.

The stator arrangement 10 further comprises a conveyor device 22, comprising a fan 24 and a fan drive 26. The conveyor device 22 draws in with the fan 24 air from the neighborhood U of the stator arrangement 10 in a manner which is known per se and feeds it to a fan outlet 28 in a conveying line arrangement 30 with four conveying lines 32, 34, 36, and 38.

The two conveying lines 32 and 34 serve for convective cooling of the coil arrangement 12. The conveying lines 36 and 38 serve for convective cooling of the coil arrangement 14. In the present example, the modules consisting of coil arrangement 12 and conveying lines 32 and 34 on the one hand and of coil arrangement 14 and conveying lines 36 and 38 on the other are configured identically. The said modules are arranged alongside each other to reinforce the propulsive force achievable along the sequence axis F.

It suffices, therefore, to describe below only one of the modules as a representative for both, since its description also applies to the respective other module.

The fluid lines 32 and 34 exhibit, starting from the fan outlet 28, first one flexible hose 40 or 42 respectively each, which via a connector module 44 or 46 respectively, in the present case one L-connector module each, are connected with a pipe component 48 or 50 respectively. The two pipe components 48 or 50 respectively, which blow at opposite sides of the coil housing 16 via outlet ports 52, are configured identically and arranged mirror-symmetrically relative to a plane of symmetry SE that passes through the coil housing 16 in the middle of its thickness.

Through the pipe component nearest to the observer in FIG. 1 for cooling the outside of the stator housing 18 facing towards the observer of FIG. 1, there is discernible an attachment bar 53 for attaching the coil arrangement 16 and the coil housing 18 to the carrier plate 20. Instead of L-connector modules, T-connector modules can also be used if cooling sections have to be arranged along the sequence axis F in front of and behind the connector modules.

In the region between the connector modules 44 and 46 there is arranged a sensor device 54, which detects a magnetic field of a magnet arrangement approaching the coil arrangement 12 along the sequence axis F in FIG. 1 from the left as a rotor component of a linear motor formed out of stator arrangement 10 and rotor component, said rotor component interacting magnetically with the stator arrangement 10, in particular with the coil arrangement 12, thereby determining the position of the magnet component. An identical sensor device 56 is arranged in a corresponding position before the coil arrangement 14. The sensor devices 54 and 56 can for example each comprise at least one Hall sensor in order to detect the magnetic field of the rotor component moving relative to the stator arrangement 10.

A temperature sensor 55 in the coil housing 18 detects the temperature in the coil housing 18 and outputs the detection result to a control device 57. The control device 57 controls, in accordance with the detection signal of the temperature sensor 55, the fan drive 26. In the coil housing 16 also a temperature sensor 55 is arranged and linked with the control device 57 for the purpose of signal transmission. This is not depicted, solely for the sake of improved clarity.

Figure 2:
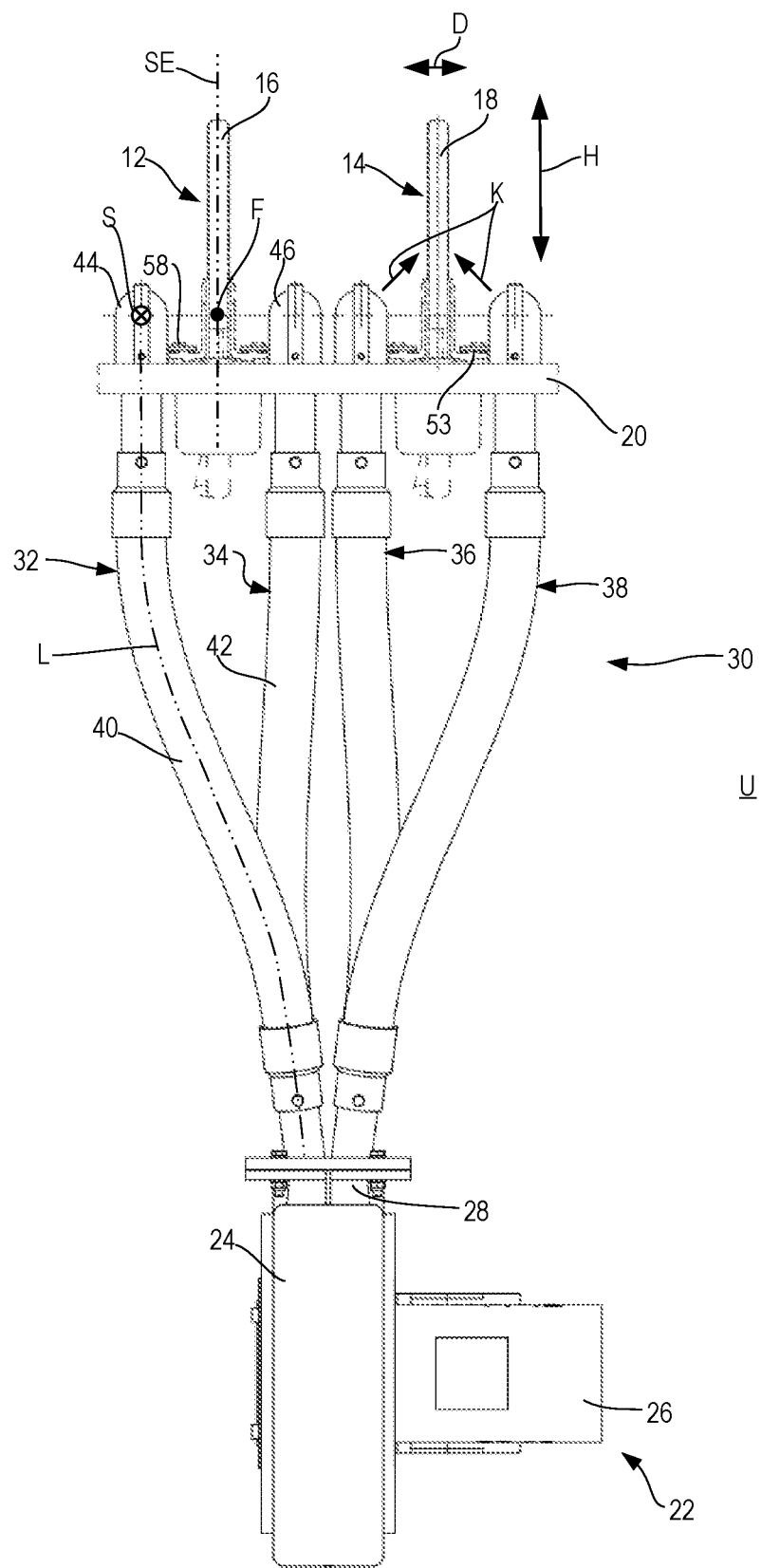

In FIG. 2 the plane of symmetry SE, relative to which the pipe components 48 and 50 are arranged mirror-symmetrically, can be better discerned than in FIG. 1. For the sake of improved clarity, in FIG. 3 the coil arrangements 12 and 14 together with their coil housings 16 and 18 are omitted as are the sensor devices 54 and 56. In both FIGS. 2 and 3, the plane of symmetry SE is respectively oriented orthogonally to the plane of the drawing. The thickness direction of the coil arrangements 12 and 14 and of the coil housings 16 and 18 which is parallel to the parallel winding axes of the coils 15 is labelled with D in FIG. 2. The height direction of the coil arrangements 12 and 14 and of the coil housing 16 and 18 is labelled with H in FIG. 2. The thickness direction D, the height direction H, and the sequence axis F are respectively orthogonal to one another.

Figure 3:
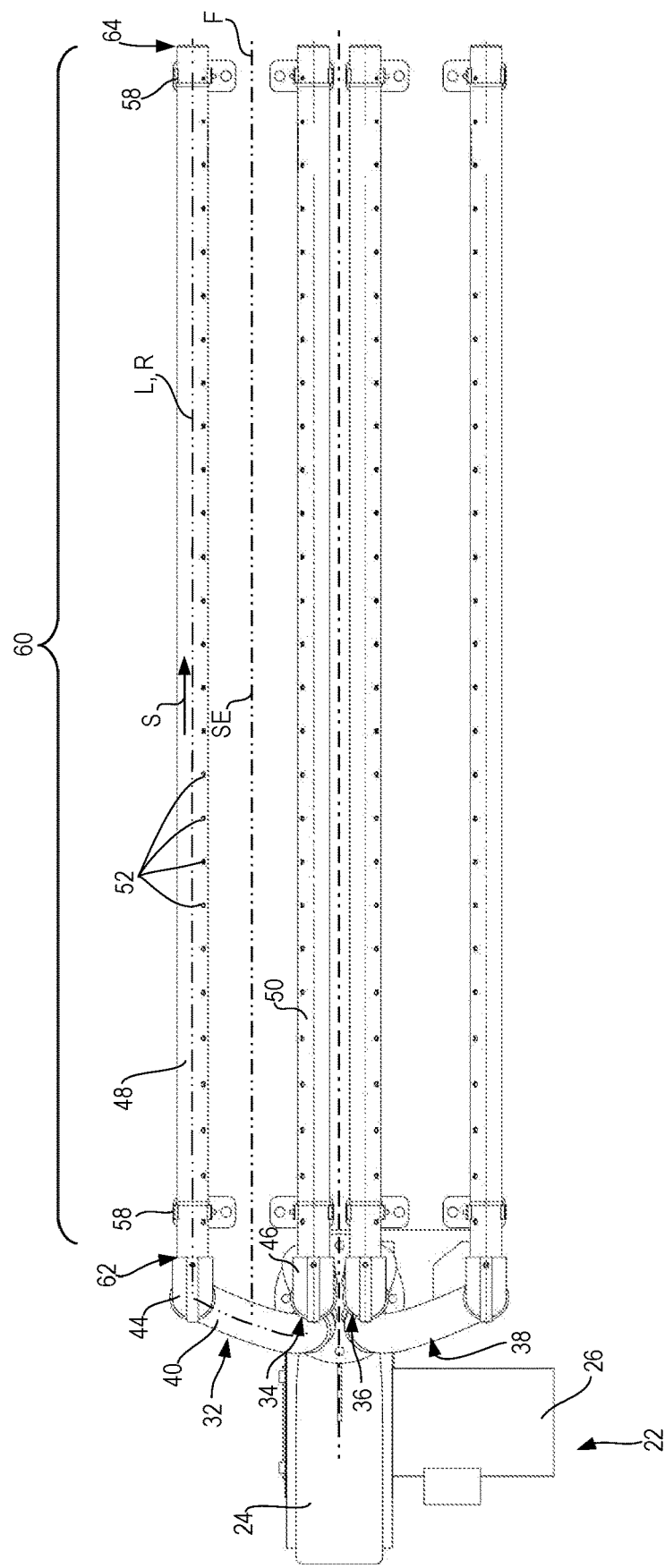

By way of example for the fluid line 32, FIGS. 1 to 3 depict a virtual pathway L which is conceived as passing centrally through the fluid line 32. The course of the pathway L is bent in the region of the flexible hose 40, L-shaped in the region of the connector modules 44, and straight along of the pipe component 48. The section of the pathway L located in the pipe component 48 coincides with the pipe axis R of the pipe component 48. The pipe component 48 can exhibit an arbitrary cross-sectional shape, for instance square, rectangular, or generally polygonal, but preferably is a cylindrical pipe component, since during the assembly of the stator arrangement 10 this shape permits straightforward orientation of the outlet ports 52 relative to the coil arrangement 12 by rotating the pipe component 48 about its pipe axis R. The pipe component 48 is supported along the pipe axis R by means of clamping brackets 58 arranged at a spacing from one another, which has loosened clamping brackets 58 permit rotation about the pipe axis R of the pipe components 48 supported by them when the clamping force is decreased. When the desired angular orientation of the outlet ports 52 about the pipe axis R and consequently also about the straight section of the pathway L located in the pipe component 48 is reached, the clamping brackets 58 can be tightened and the pipe component 48 thus fixed.

As can be discerned in FIG. 3, the pipe component 48 forms a cooling section 60 along which air conveyed by the conveyor device 22 emerges to the stator arrangement 12, towards which the outlet ports 52 face, as convectively cooling air. Air is introduced into the pipe component 48 at its one longitudinal end as the inlet longitudinal end 62 which is coupled directly to the connector module 44, which flows through the pipe component 48 in the direction of flow S. The longitudinal end 64 of the pipe component 48 opposite to the inlet longitudinal end 62 is closed off by an end wall orthogonal to the pathway L. The air introduced by the conveyor device 22 with positive pressure relative to the ambient pressure into the pipe component 48 and thus into the cooling section 60, can consequently emerge towards the coil arrangement 12 only through the outlet ports 52.

For the sake of improved clarity, in FIG. 2 the outlet of the fluid towards the coil arrangement 14 is indicated by the arrows K at the coil arrangement 14 and at the fluid lines 36 and 38 arranged at a spacing from it. Since the coil arrangement 14 with the fluid lines 36 and 38 provided for its convective cooling is configured identically to the coil arrangement 12 with the fluid lines 32 and 34, the depiction of the arrows K also applies mutatis mutandis to the fluid flowing out in the cooling section 60 from the pipe components 48 and 50 towards the coil arrangement 12.

FIG. 4 depicts the pipe component 48 in a top view, with the direction of view along the midlines M (see FIG. 6) of the outlet ports 52 passing through the wall of the fluid line 32 in the cooling section 60 and oriented orthogonally to the plane of the drawing of FIG. 4. The pipe component 48, the pipe component 50, and the pipe components associated with coil arrangement 14 are configured identically, such that the description of the pipe component 48 applies to all pipe components of the first embodiment. The pipe component 48 exhibits exactly one row of outlet ports 52 arranged one after another along the sequence axis F or along the section of the pathway L located in the pipe component 48 respectively.

In order to provide adequate cooling of the coil arrangement 12 on the one hand and to homogenize the cooling rate along the pathway L achieved by means of the air emerging from the outlet ports 52 on the other, the outlet ports 52 are configured with quantitatively different-sized outlet port cross-sections. For example, the first six outlet ports 52 following the inlet longitudinal end 62 in the direction of flow S can exhibit an identical outlet port cross-section which is larger than the in turn identical outlet port cross-sections of the following 17 outlet ports. These 17 outlet ports can in turn exhibit a larger outlet port cross-section than the next two outlet ports, whose identical outlet port cross-sections in turn are larger than the identical outlet port cross-sections of the last two outlet ports 52 of the pipe component 48 or of the cooling section 60 respectively.

Consequently, the cooling section 60 exhibits a first port region 66 located nearest to the inlet longitudinal end 62 with outlet ports 52 with uniformly largest outlet port cross-sections, exhibits a second port region 68 adjacent to it in the direction of flow S with in turn uniform outlet port cross-sections which however are smaller than in the first port region 66, exhibits a third port region 70 with two outlet ports 52 with the second-smallest outlet port cross-sections of the cooling section 60, and finally exhibits a fourth port region 72 with two outlet ports 52 with the smallest outlet port cross-sections.

The by way of example circular outlet ports 52 can exhibit in the second port region 68 a diameter smaller by 8% to 10% than the outlet ports 52 in the first port region 66. The diameter of the two outlet ports 52 in the third port region 70 can likewise be smaller by 8% to 10% than the diameter of the outlet ports 52 in the second port region 68. The diameter of the outlet ports 52 in the fourth port region 72 can even be smaller by 20% to 25% than those of the outlet ports 52 in the third port region 70. All percentages are based on the respectively larger diameter of the relevant comparison.

The outlet port cross-sections of the outlet ports 52 are thus only smaller or remain the same size for a section along the pathway L in the direction of flow S, but do not become larger.

Likewise, consecutive outlet ports 52 are arranged along the pathway L at differing spacings from one another, namely in such a way that the spacings between two outlet ports 52 following one another immediately along the pathway L in the direction of flow S only remain equal and become smaller section-wise, but do not become larger.

Thus the first six outlet ports 52 are located in a first spacing region 74, in which outlet ports 52 immediately following one another along the pathway L are each arranged at an identical spacing a from each other, which is also the largest section a occurring between immediately consecutive outlet ports 52 of the pipe component 48 or of the cooling section 60 respectively.

The remaining 21 outlet ports 52 are located in the second spacing region 76, in which the spacings a between two consecutive outlet ports 52 again are quantitatively equal in size, but smaller than in the first spacing region 74. The arrangement of the outlet ports 52 at differing spacings also serves, with at the same time secured cooling effect, for the homogenization of the cooling rate of the cooling section 60 along the pathway. The spacings between outlet ports 52 in the second spacing region 76 are about 4% to 6% smaller than the spacings in the first spacing region 74. Once again the percentages are based on the larger of the two spacings a being compared.

The port regions and spacing regions shown in the depicted embodiment example are solely a preferred embodiment example. The port regions and/or spacing regions can also be designed otherwise than in the depicted embodiment example.

FIG. 5 shows the pipe component 48 in partial section and rotated by 90° about the pipe axis R or about the region of the pathway L located in the cooling section 60 respectively in such a way that the outlet ports 52 lie in the plane of the drawing of FIG. 5.

In the interior of the pipe component 48 there is arranged a preferably plane partition 78, which extends along a separation region 80. Within this separation region 80, the partition 78 subdivides the interior volume of the pipe component 48 into an upper part-volume 82 and a lower part-volume 84 as shown in FIG. 5. Along the pathway L before and after the separation region 80, the interior volume of the pipe component 48 is undivided.

The partition 78 extends along the pathway L over a little more than half of the extension length of the pipe component 48, and since the pipe component 48 overlaps at its region located nearer to the inlet longitudinal end 62 with the L-connector component 44, over more than half of the extension length of the cooling section 60. The length share of the separation region 80 in the length extension of the cooling section 60, therefore, is larger than the length share of the separation region 80 in the pipe component 48.

Figure 6:
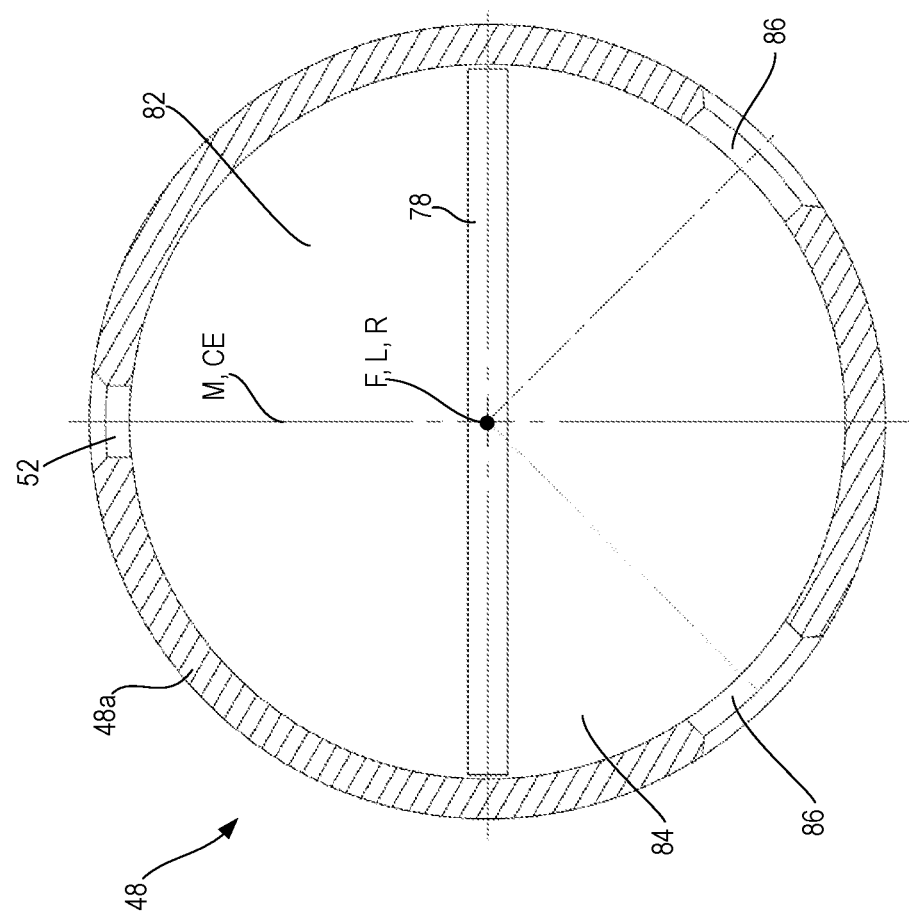

The partition 78 extends along a diameter through the interior region of the pipe component 48. This is especially clearly discernible in FIG. 6. As is likewise discernible in FIG. 6, the outlet ports 52 are situated in the peripheral middle of the upper wall section 48a of the pipe component 48 that surrounds the part-volume 82 together with the partition 78. Only the upper part-volume 82 in FIG. 6 is connected directly with the external environment U through outlet ports 52. All outlet ports 52 therefore are situated in the same, preferably semi-cylindrical, wall section 48a. The midlines M of the outlet ports 52 lie preferably in a common plane CE, which also contains the pipe axis R and thus the region of the pathway L located in the cooling section 60. The midlines M are therefore oriented orthogonally to the partition 78.

The two ports 86 discernible in FIG. 6, which due to the offset sectional plane VI-VI do not lie in a common plane with the outlet ports 52, serve merely for simplified orientation of the pipe component 48 in the clamping brackets 58. The ports 86 can interact with catch mechanisms in the clamping brackets 58, for example with spring-loaded balls, to create a non-permanent catch engagement. Once the catch engagement has been created, the outlet ports 52 have the desired orientation relative to the coil arrangement 12 or 14 towards which they should face. Due to the mirror-symmetrical orientation of the pipe components 48 and 50 relative to the coil arrangement 12 located between them, the ports 86 are also arranged mirror-symmetrically relative to the plane of symmetry CE defined by the midlines M and the pipe axis R. Consequently, the pipe component 48 can be installed both in the orientation shown in FIG. 1 for the pipe component 48 and in that shown for the pipe component 50.

By means of the partition 78, which in the depicted example extends in port region 68, 70, and 72, but only in the spacing region 76, noise generation due to the air emerging through the outlet ports 52 can be reduced considerably.

Figure 7:
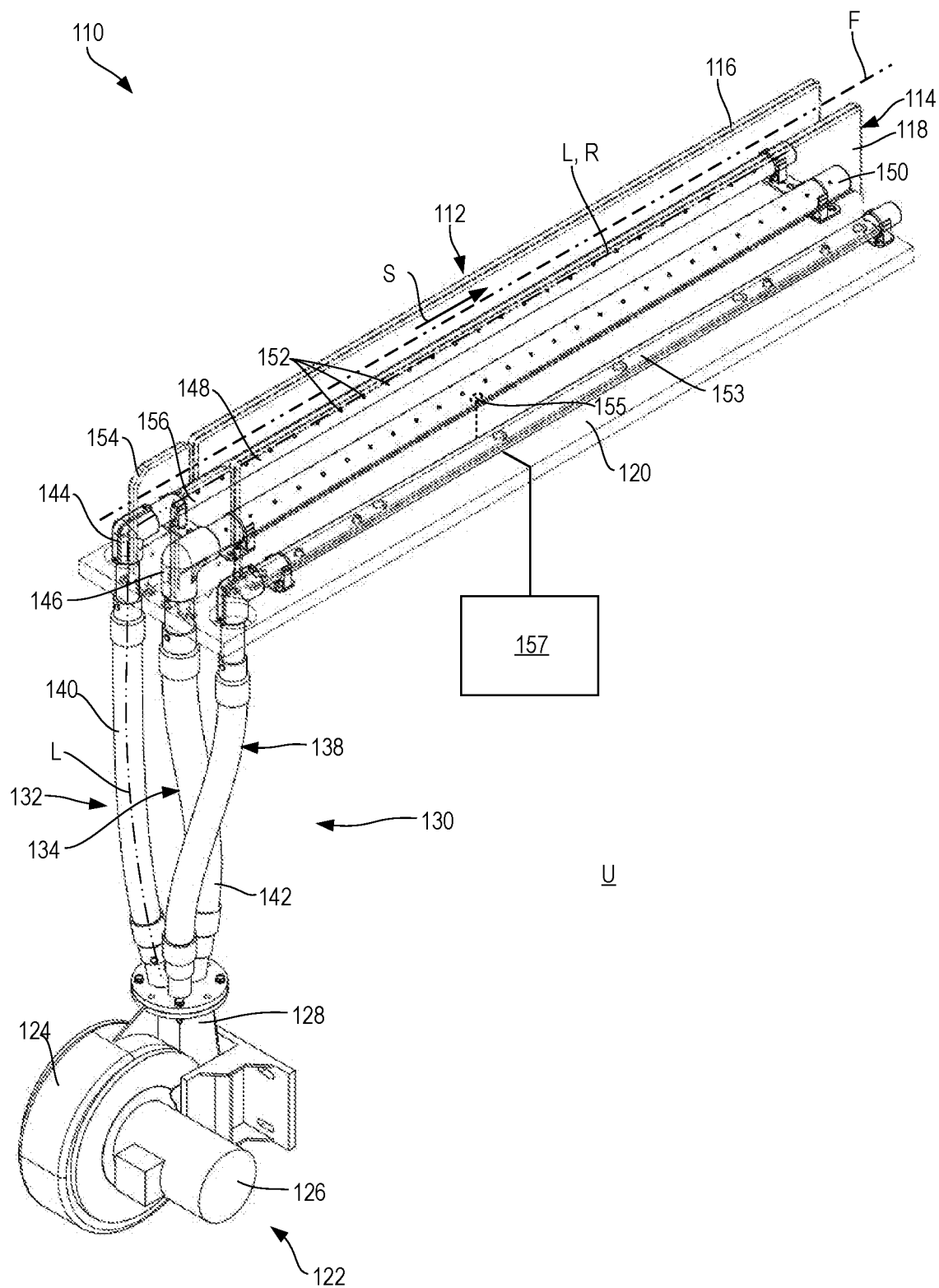
Figure 8:
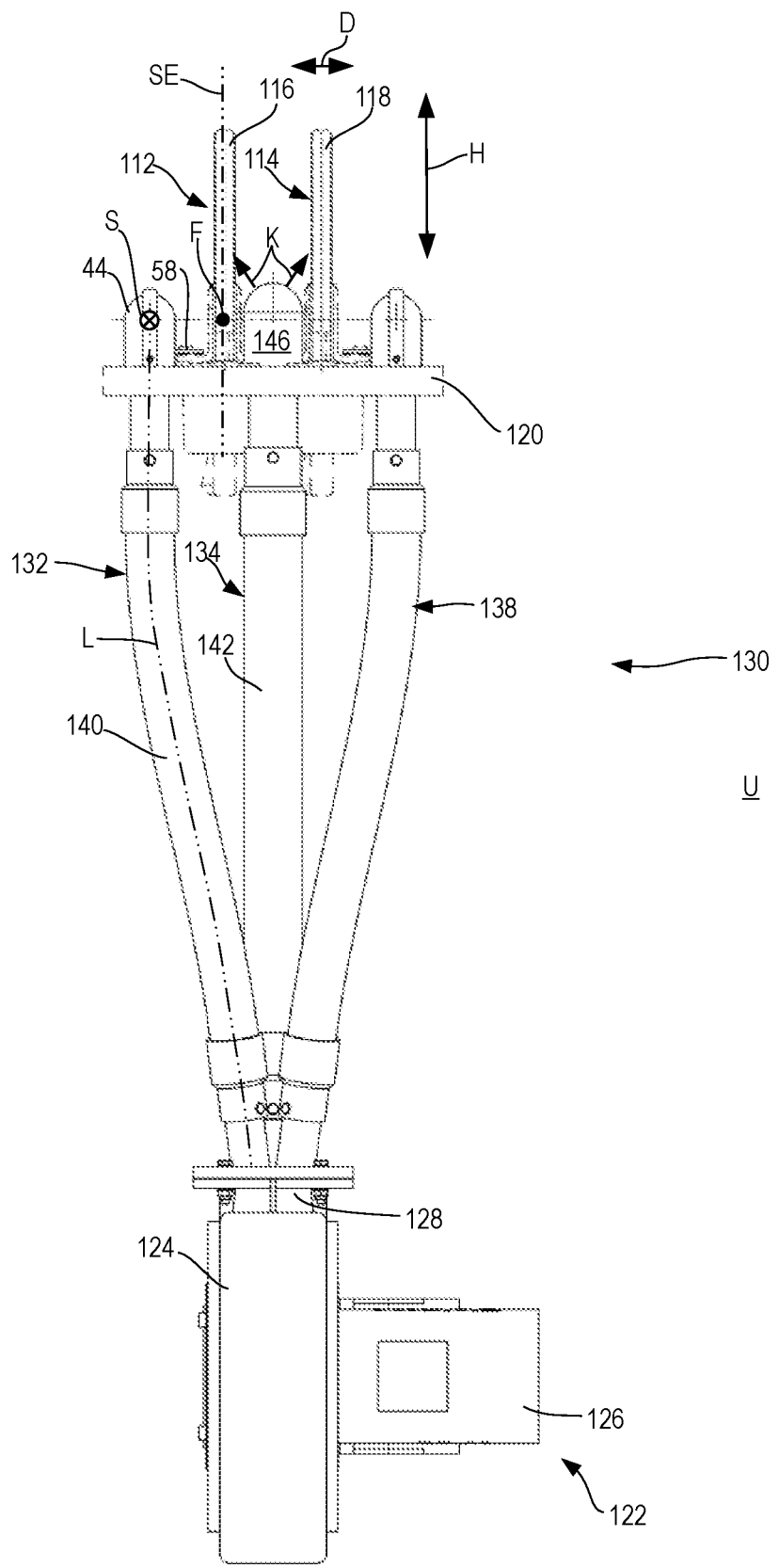
Figure 9:
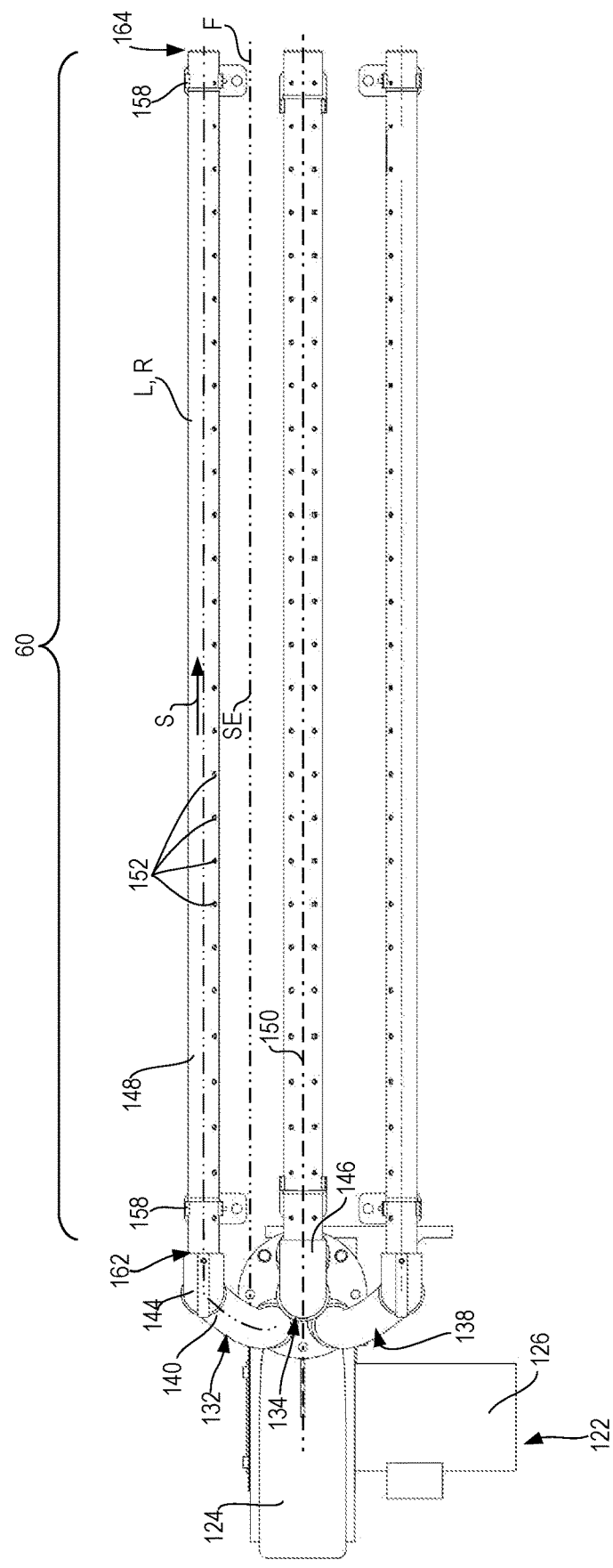

FIG. 7 shows in a perspective corresponding to that of FIG. 1 a second embodiment of the invention's stator arrangement 110. Identical and functionally identical components and component sections as in the first embodiment of FIGS. 1 to 6 are labelled in the second embodiment of FIGS. 7 to 12 with the same reference labels, but increased numerically by 100.

The second embodiment is elucidated hereunder only in so far as it differs from the first embodiment, whose description should otherwise be referred to for elucidating the second embodiment also.

The essential difference between the first and the second embodiment consists in the fact that in the second embodiment only one pipe component 150 is arranged in the region between the two parallel coil arrangements 112 and 114, which exhibits two parallel rows of outlet ports 152, one each for blowing at coil arrangement 112 and for blowing at coil arrangement 114. The two rows of outlet ports 152 of the pipe component 150 are configured identically, i.e. at the same longitudinal coordinate along the pathway L the outlet ports 152 arranged in different peripheral sections exhibit identical outlet port cross-sections.

Because of the convective cooling of the sides that are to face towards each other of coil arrangements 112 and 114 through a single pipe component 150, the fluid line 136 is omitted in the second embodiment. Since in the region between the coil arrangements 112 and 114 only one pipe component 150 has to be arranged, instead of two parallel pipe components as in the first embodiment, the two coil arrangements 112 and 114 can be arranged at a smaller spacing from one another than in the first embodiment.

In FIG. 10, the pipe component 150 is depicted in perspective in a top view that corresponds to the perspective of FIG. 4. The observer of FIG. 10 looks orthogonally at the partition 178 which is arranged in the interior of the pipe component 150 and hidden by the pipe wall. The direction of view is orthogonal to the region of pathway L located in the cooling section 160. The two rows of outlet ports 152 lie on both sides of plane CE which is orthogonal to the plane of the drawing of FIG. 10 and contains the pathway L.

Otherwise than in the first embodiment, the second embodiment exhibits one port zone 194 with three port regions 188, 190, and 192 contained in it, each with two pairs of consecutive outlet ports 152 along the pathway L. As in the first embodiment, the outlet port cross-sections of outlet ports 152 are equal in size within each port region. The outlet port cross-sections of the outlet ports, however, increase in the direction of flow S from port region 188 to port region 192, namely from port region 188 to port region 190 by 20%, based on the outlet port cross-section of the larger outlet ports 152 of the port region 190, and from port region 190 to port region 192 by about 15% to 20%, based on the outlet port cross-section of the larger outlet ports 152 of the port region 192.

Adjacent to port zone 194 in the direction of flow S are the port regions 168, 170, and 172, whose outlet ports 152 correspond to those of port regions 68, 70, and 72. The outlet ports 152 of the port region 168 correspond in their outlet port cross-section those of the port region 190.

The spacing regions 174 and 176 correspond to the spacing regions 74 and 76 of the first embodiment.

The same applies to partition 178 as to partition 78 in the first embodiment.

Figure 12:
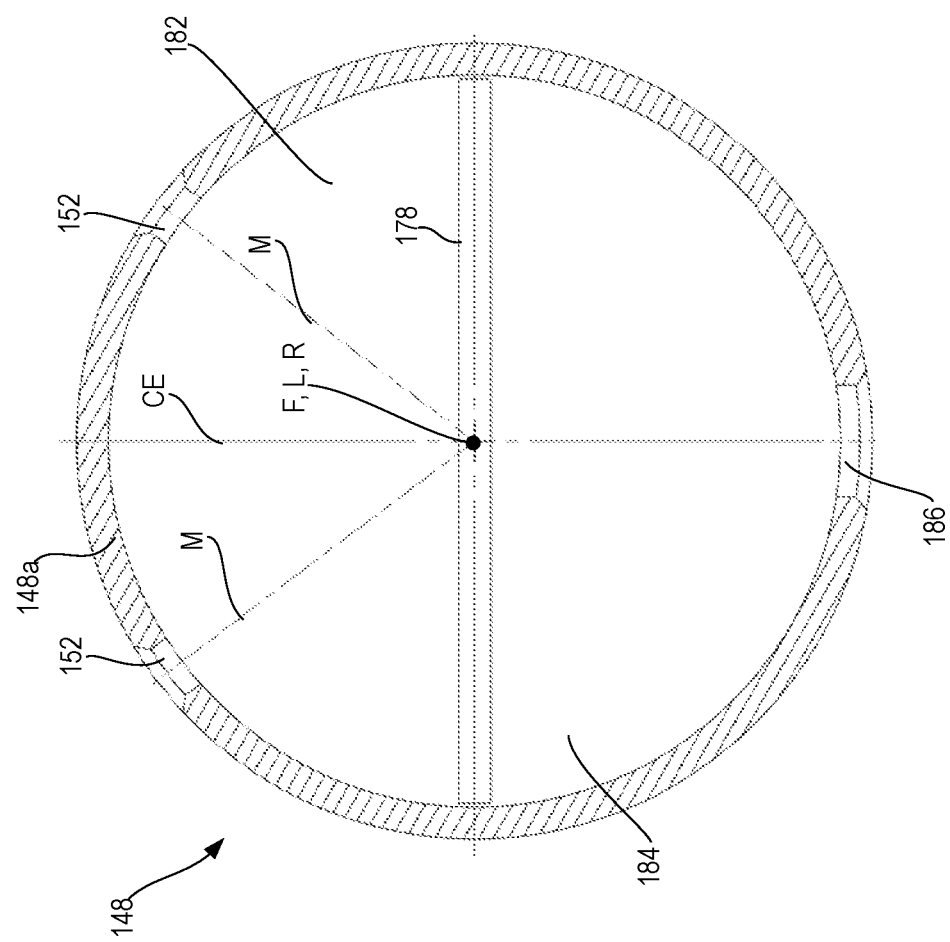

FIG. 12 depicts the cross-section through the pipe component 150 along the offset sectional plane XII-XII of FIG. 10. Since the pipe component 150 only still has to be arranged in an orientation between two coil arrangements, one port 186 suffices as an arrangement or orientation aid along the periphery of the pipe component 150.

The outlet ports 152 of the two rows of outlet ports 152 at the pipe component 150 are arranged in the peripheral direction around the pathway L symmetrically relative to the plane of symmetry CE containing the pathway L and orthogonal to the partition 178, namely in such a way that their midlines M lie within an angular region of about 75°. This condition also applies to the single row at outlet ports 52 of the first embodiment, which likewise are arranged symmetrically relative to the plane of symmetry CE, since the midlines of the outlet ports 52 are contained in the plane of symmetry CE.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention.

Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A Linear motor stator arrangement capable of convective forced cooling, comprising a coil arrangement with a plurality of conductive electrical coils arranged one after another along a sequence axis for generating a temporally and spatially varying magnetic field in a neighborhood of the coil arrangement, and further comprising a convective cooling device exhibiting a fluid line extending along a pathway, of which at least one section runs alongside the coil arrangement at a spacing from it, where a section of the fluid line running alongside the coil arrangement as a cooling section exhibits in a fluid line wall a large number of outlet ports which face towards the coil arrangement and are arranged one after another at a spacing from one another along the pathway, where the stator arrangement further comprises a conveyor device which is configured so as to be connected with the fluid line and for conveying a fluid in the fluid line and through the outlet ports to the coil arrangement, where in the cooling section there are provided along the pathway outlet ports with quantitatively different outlet port cross-sections through which fluid can flow and/or the spacings between two outlet ports arranged immediately one after another along the pathway are quantitatively different along the pathway in different regions of the cooling section.

2. The Linear motor stator arrangement according to claim 1, wherein during operation of the conveyor device the fluid flows through the cooling section along the pathway in a direction of flow, where in a port region of the cooling section located further downstream there is provided at least one outlet port with a smaller outlet port cross-section than in a port region located further upstream.

3. The Linear motor stator arrangement according to claim 2, wherein the cooling section exhibits at least two port regions following one another in the direction of flow, of which a first port region exhibits at least one outlet port with a larger outlet port cross-section than a second port region immediately following the first port region in the direction of flow.

4. The Linear motor stator arrangement according to claim 3, wherein along a separation region in the cooling section a partition is arranged in the interior of the fluid line, which along its extension physically subdivides an interior volume of the fluid line into two part-volumes separated from one another, the partition extends over more than one port region.

5. The Linear motor stator arrangement according to claim 2, wherein a port zone of the cooling section located further upstream exhibits at least two port regions following one another in the direction of flow of which a first port region exhibits at least one outlet port with a smaller outlet port cross-section than a second port region immediately following the first port region in the direction of flow.

6. The Linear motor stator arrangement according to claim 2, wherein the cooling section includes a plurality of port regions and at least two of the plurality of port regions located one after another in the direction of flow exhibit at least one of a different number of outlet ports and a different length along the pathway.

7. The Linear motor stator arrangement according to claim 2, wherein the cooling section includes a plurality of port regions, for at least one port region, of the plurality of port regions, the outlet port cross-sections of all outlet ports of the at least one port region are quantitatively equal in size.

8. The Linear motor stator arrangement according to claim 1, wherein during operation of the conveyor device the fluid flows through the cooling section along the pathway in a direction of flow, where in a spacing region of the cooling section located further downstream outlet ports are arranged along the pathway at a smaller spacing from one another than in a spacing region located further upstream.

9. The Linear motor stator arrangement according to claim 8, wherein the cooling section exhibits at least two spacing regions following one another in the direction of flow, of which in a first spacing region outlet ports are arranged following one another at a greater spacing than in a second spacing region immediately following the first spacing region in the direction of flow.

10. The Linear motor stator arrangement according to claim 8, wherein the spacing region is a plurality of spacing regions and at least two spacing regions of the plurality of spacing regions lying one after another in the direction of flow exhibit at least one of a different number of outlet ports and a different length along the pathway.

11. The Linear motor stator arrangement according to claim 8, wherein the spacing region is a plurality of spacing regions and for at least one spacing region of the plurality of spacing regions it is the case that the spacings between two outlet ports immediately following one another in the direction of flow are quantitatively equal in size for all outlet ports of the at least one spacing region.

12. The Linear motor stator arrangement according to claim 8, wherein along a separation region in the cooling section a partition is arranged in the interior of the fluid line, which along its extension physically subdivides an interior volume of the fluid line into two part-volumes separated from one another, the partition extends completely within one spacing region.

13. The Linear motor stator arrangement according to claim 1, wherein along a separation region in the cooling section a partition is arranged in the interior of the fluid line, which along its extension physically subdivides an interior volume of the fluid line into two part-volumes separated from one another.

14. The Linear motor stator arrangement according to claim 13, wherein the part-volumes located on both sides of the partition differ in their size by not more than 10% based on a larger of the part-volumes.

15. The Linear motor stator arrangement according to claim 13, wherein the partition is a plane partition.

16. The Linear motor stator arrangement according to claim 13, wherein the partition extends over more than 40% of the length of the cooling section.

17. The Linear motor stator arrangement according to claim 13, wherein the fluid is introduced into the cooling section at a longitudinal end of it and the partition is arranged with at least 70% of its longitudinal extension in the region located further downstream than the longitudinal middle of the cooling section.

18. The Linear motor stator arrangement according to claim 13, wherein the partition is arranged at a spacing from both longitudinal ends of the cooling section.

19. The Linear motor stator arrangement according to claim 13, wherein all the outlet ports arranged in the separation region are arranged on the same side of the partition.

20. The Linear motor stator arrangement according to claim 1, wherein a plurality of outlet ports are arranged in such a way that their virtual midlines passing through a line wall are located within an angular region of not more than 90° around the pathway.

\* \* \* \* \*